(12) United States Patent  (10) Patent No.: US 7,419,453 B2
Liu  (45) Date of Patent: Sep. 2, 2008

(54) DIFFERENTIAL GEAR SYSTEM WITH A THREE-STEP CONTROL MECHANISM

(76) Inventor: Jen-Chih Liu, 235 Chung - Ho Box 8-24, Taipei (TW)

( * ) Notice: Subject to any disclaimer, the term of this patent is extended or adjusted under 35 U.S.C. 154(b) by 307 days.

(21) Appl. No.: 11/416,427

(22) Filed: May 3, 2006

(65) Prior Publication Data
US 2007/0259752 A1   Nov. 8, 2007

(51) Int. Cl.
 *F16H 48/30* (2006.01)
(52) U.S. Cl. ..................................... 475/250
(58) Field of Classification Search ............... None
 See application file for complete search history.

(56) References Cited

U.S. PATENT DOCUMENTS

| 968,224 | A | * | 8/1910 | Wolf | 475/237 |
|---|---|---|---|---|---|
| 2,638,797 | A | * | 5/1953 | Gross | 475/237 |
| 5,106,351 | A | * | 4/1992 | Williams et al. | 475/250 |
| 5,499,951 | A | * | 3/1996 | Showalter | 475/204 |
| 5,853,342 | A | * | 12/1998 | Pritchard et al. | 475/206 |
| 7,147,584 | B1 | * | 12/2006 | Lu | 475/250 |
| 2007/0225110 | A1 | * | 9/2007 | Liu | 475/331 |

* cited by examiner

*Primary Examiner*—Dirk Wright

(57) ABSTRACT

A differential gear system with a three-step control mechanism uses the axial motion of a single member to achieve three functions of ON, OFF and LOCK. The differential gear system has a locking mechanism installed in the planetary gear carrier between two planetary gears thereof. Extra space for the locking mechanism is not necessary. It can be applied to differential gear systems with spiral bevel gears and with regular gears. The locking mechanism can be mounted between two planetary gears of the planetary gear carrier or on the shaft of the planetary gear corresponding to the other planetary gear connected with the clutch sleeve. Accordingly, the differential gear system with a three-step control mechanism comprises a left shaft, a right shaft and a planetary gear carrier between the left shaft and the right shaft. The left shaft and the right shaft are respectively one-piece axles provided with end connecting sections.

15 Claims, 6 Drawing Sheets

DIFFERENTIAL GEAR SYSTEM WITH A THREE-STEP CONTROL MECHANISM

FIELD OF THE INVENTION

The present invention relates to automobile differential gear systems, more particularly to a differential gear system with a three-step control mechanism utilizes a three-point axial motion of a clutch sleeve mounted on one of the input shafts to achieve switching functions of on, off and lock of a differential gear system. The three-step control mechanism that can be applied to differential gear systems with spiral bevel gears and with regular gears. The locking mechanism can be mounted between two planetary gears of a planetary gear carrier (between the left and the right shafts) or on the shaft of the planetary gear corresponding to the other planetary gear connected with the clutch sleeve.

BACKGROUND OF THE INVENTION

Automobile differential gear system of the prior art have three functions: ON, OFF and LOCK. The ON and OFF functions are traditionally assigned in a common control unit, whereas the LOCK function is attributed to another mechanism. However, this design does not provide adroit control. The invention disclosed by U.S. Pat. No. 5,997,428 is an example, in which the input shaft for the differential gear is switchable between ON and OFF. But the shaft is designed to be a double-section type, having merely the functions of ON and OFF.

On the other hand, the inventions disclosed by U.S. Pat. Nos. 6,634,978 and 6,450,915 have the functions ON, OFF and LOCK are all disposed behind a side gear on one side of a planetary gear carrier, wherein a slide sleeve will be shifted stepwise to engage and drive the side gear or the planetary gear carrier. However, the engagement between the sleeve and the planetary gear carrier is realized behind the side gear on the inner rim of the outer shell of the sleeve. Therefore, not only the size of the control mechanism is enlarged but also the weight and the production cost are increased.

SUMMARY OF THE INVENTION

Accordingly, the primary objective of the present invention is to provide a differential gear system with a three-step control mechanism uses the axial motion of a single member to achieve three functions of ON, OFF and LOCK. The differential gear system has a locking mechanism installed in the planetary gear carrier between two planetary gears thereof, whereby extra space for the locking mechanism is not necessary. The locking mechanism can also be mounted between two planetary gears of the planetary gear carrier or on the shaft of the planetary gear corresponding to the other planetary gear connected with the clutch sleeve. Therefore, the differential gear system is of small size, and its production cost will be reduced.

Accordingly, the differential gear system with a three-step control mechanism comprises a left shaft, a right shaft and a planetary gear carrier between the left shaft and the right shaft. The left shaft and the right shaft are respectively one-piece axles provided with end connecting sections. The connecting section of the left shaft is connected to the left gear in the planetary gear carrier, and the connecting section of the right shaft is slidably connected with a clutch sleeve, whereby the clutch sleeve will shift along the axis of the planetary gear carrier. The clutch sleeve is provided with a retaining section for the engagement with the right shaft and the planetary gear carrier, whereby the clutch sleeve, driven by a push rod, will shift along the axis at three selected locations. As the push rod drives the clutch sleeve to the first location, it is not engaged with the right gear and the planetary gear carrier. Therefore, the differential gear system is in an OFF state. As the push rod drives the clutch sleeve along the axis to the second location, it is engaged with the right gear but not the planetary gear carrier. Therefore, the differential gear system is in an ON state. As the push rod drives the clutch sleeve along the axis to the third location, it is engaged with the right gear and the planetary gear carrier. Therefore, the differential gear system is in a LOCK state.

The secondary objective of the present invention is to provide a differential gear system with a three-step control mechanism that can be applied to differential gear systems with spiral bevel gears and with regular gears. The main feature is: the locking mechanism can be mounted between two planetary gears of the planetary gear carrier or on the shaft of the planetary gear corresponding to the other planetary gear connected with the clutch sleeve.

The various objects and advantages of the present invention will be more readily understood from the following detailed description when read in conjunction with the appended drawings.

BRIEF DESCRIPTION OF THE DRAWINGS

FIG. 2 is a side cross-sectional view of the first preferred embodiment of the present invention as a differential gear system with a three-step control mechanism, wherein the differential gear system is ON.

DETAILED DESCRIPTION OF THE PREFERRED EMBODIMENTS

The present invention as a differential gear system with a three-step control mechanism uses the axial motion of a single member to achieve three functions of ON, OFF and LOCK. The differential gear system has a locking mechanism installed in the planetary gear carrier between two planetary gears thereof, whereby extra space for the locking mechanism is not necessary. The present invention can be applied to differential gear systems with spiral bevel gears and with regular gears. The locking mechanism can be mounted between two planetary gears of the planetary gear carrier or on the shaft of the planetary gear corresponding to the other planetary gear connected with the clutch sleeve.

Figure 1:
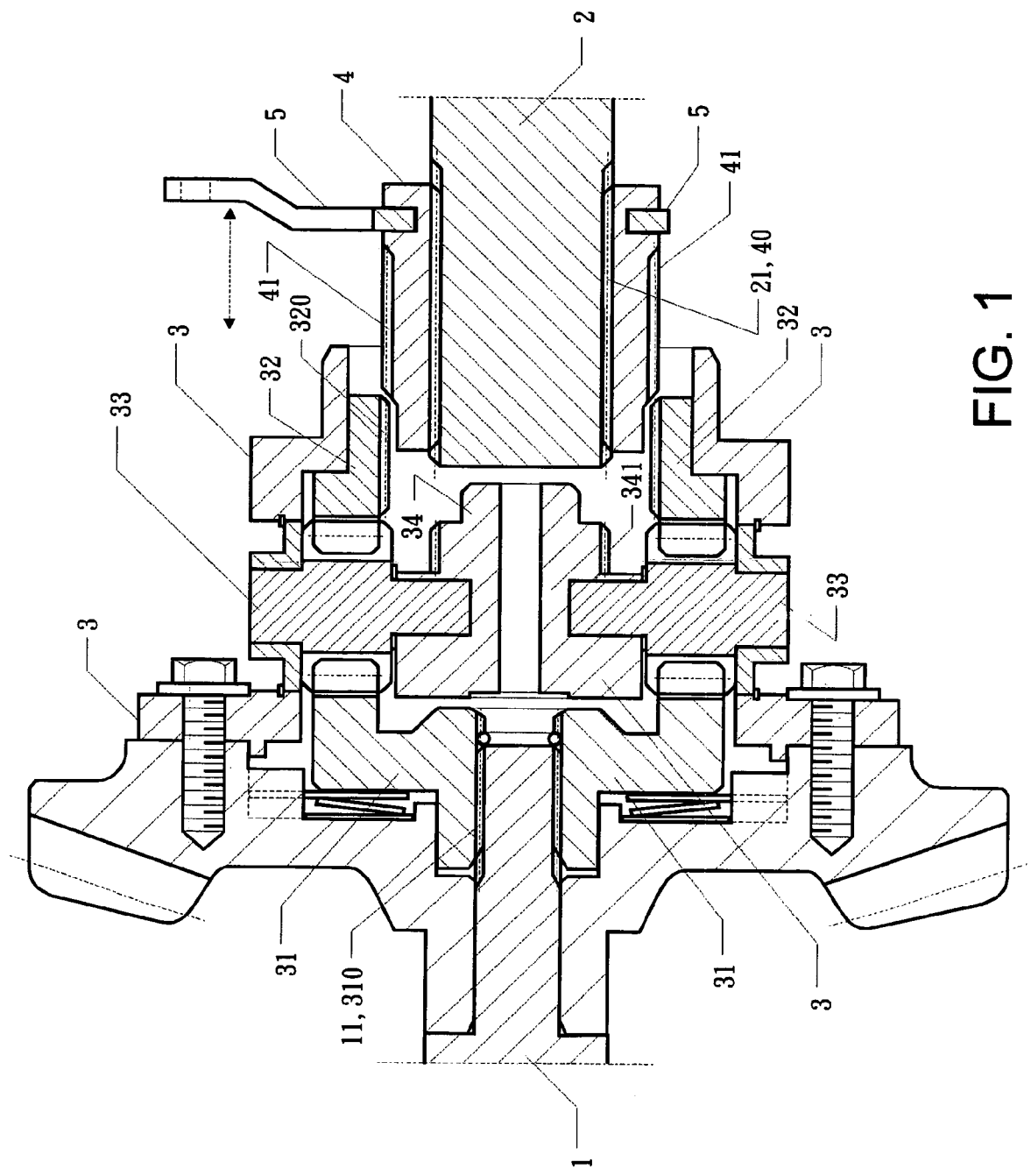
FIG. 1 is a side cross-sectional view of the first preferred embodiment of the present invention as a differential gear system with a three-step control mechanism, wherein the differential gear system is OFF.

Referring to FIG. 1, the first preferred embodiment of the present invention as a differential gear system with a three-step control mechanism comprises a left shaft 1, a right shaft 2 and a planetary gear carrier 3 between the left shaft 1 and the right shaft 2. The left shaft 1 and the right shaft 2 are each a section of axle.

The ends of the left shaft 1 and the right shaft 2 are each provided with a connecting section (11, 21). The connecting section 11 of the left shaft 1 is inserted into a retaining section 310 of the left gear 31 (which can be a spiral bevel gear or a planar gear) of the planetary gear carrier 3, and the connecting section 21 of the right shaft 2 is connected with a retaining section 40 of a clutch sleeve 4 capable of ding axial shift.

The inner surface and the outer surface of the clutch sleeve 4 are respectively provided with retaining sections 40, 41; the retaining section 40 is slidably engaged with the connecting section 21 of the right shaft 2, the retaining section 41 is engaged with the right gear 32 (which can be a spiral bevel gear or a planar gear or face gear or surface gear) of the planetary gear carrier 3. The clutch sleeve 4 is driven by a push rod 5 to do a three-step axial shift, wherein the retaining section 41 will be secured by the retaining section 341 of the engagement mount 34. An inner rim and the retaining section 341 define receptacle for the clutch sleeve 4 when it is shifted inwardly.

Figure 2:
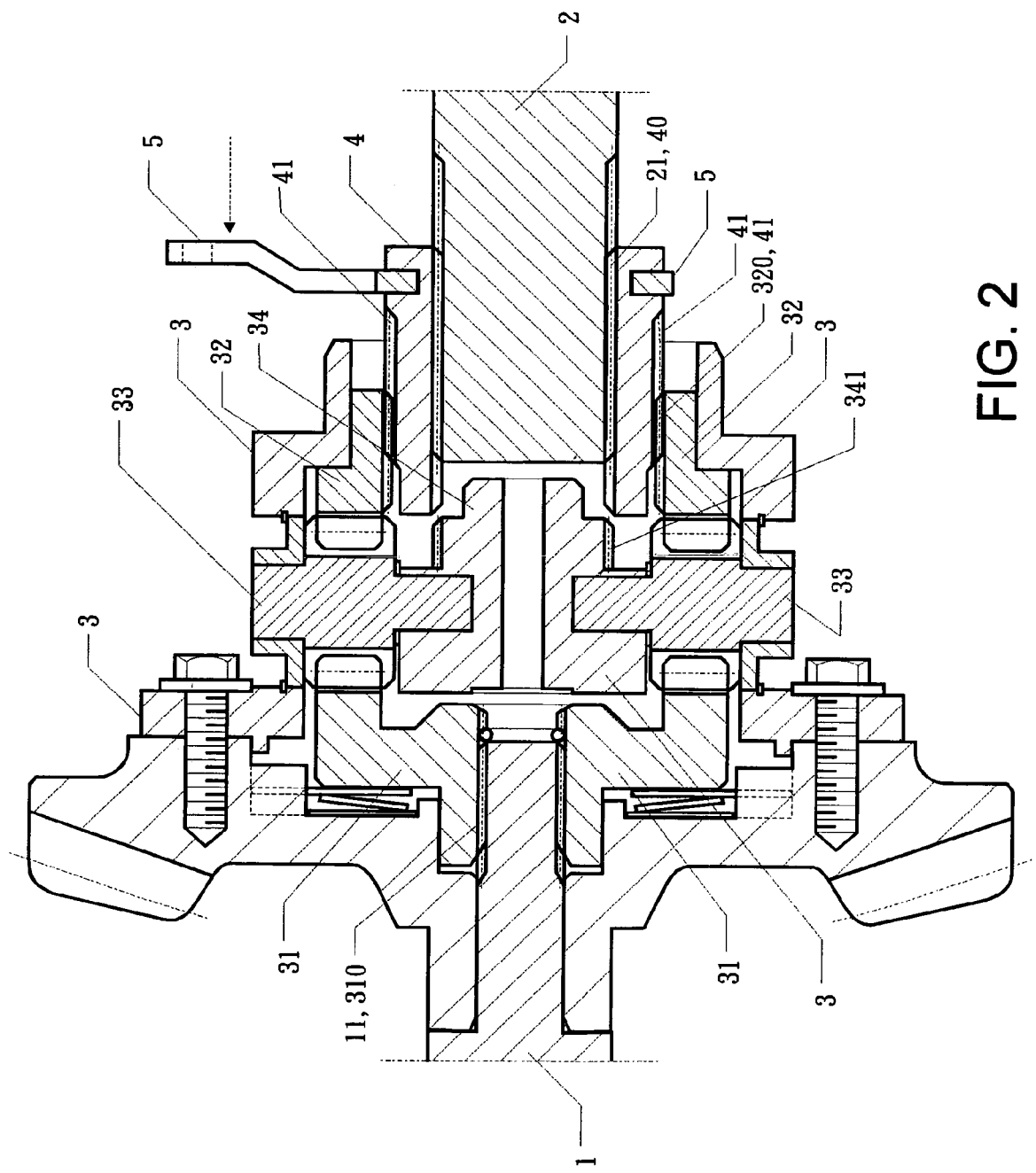
Figure 3:
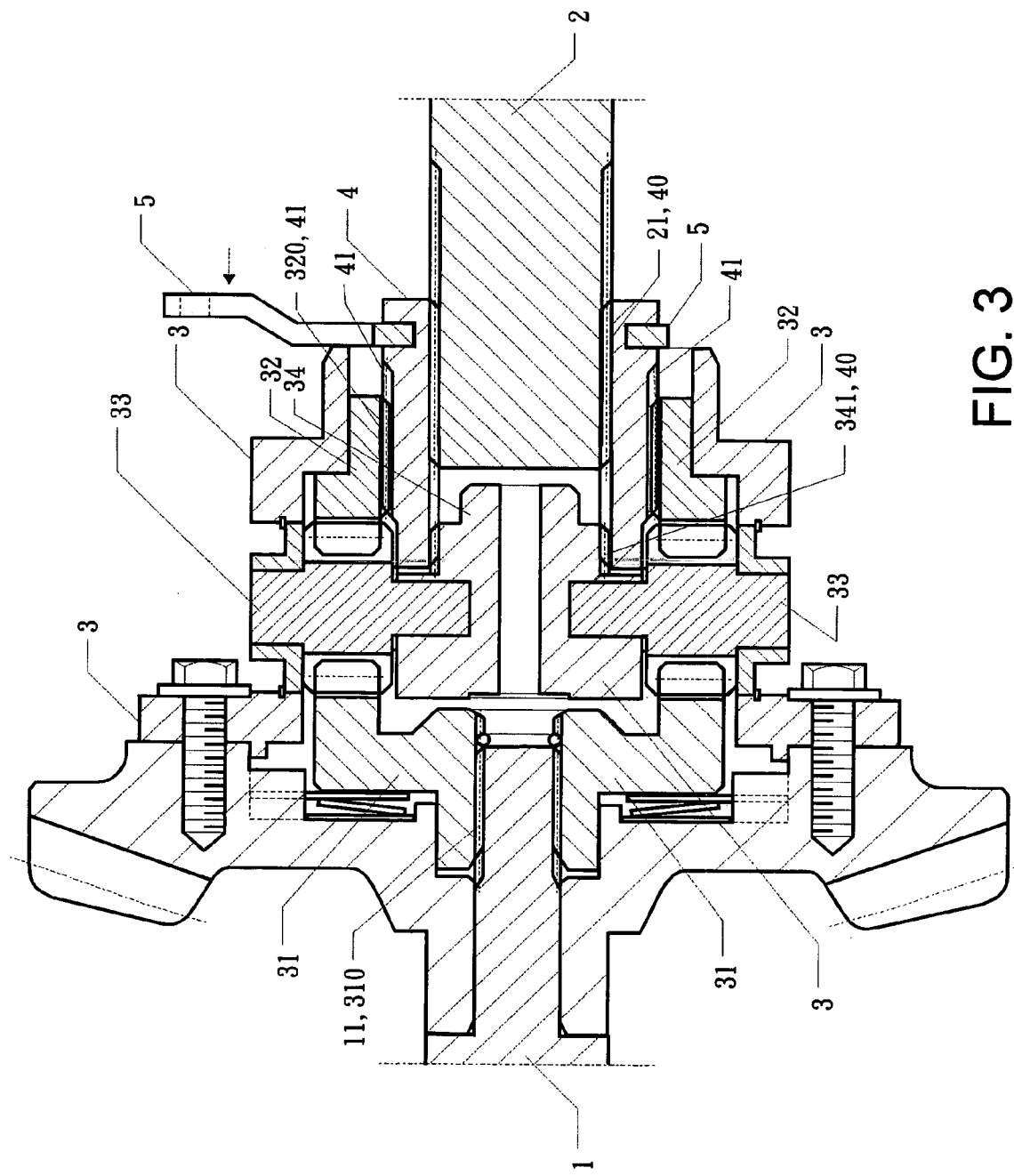
FIG. 3 is a side cross-sectional view of the first preferred embodiment of the present invention as a differential gear system with a three-step control mechanism, wherein the differential gear system is LOCK.
Figure 5:
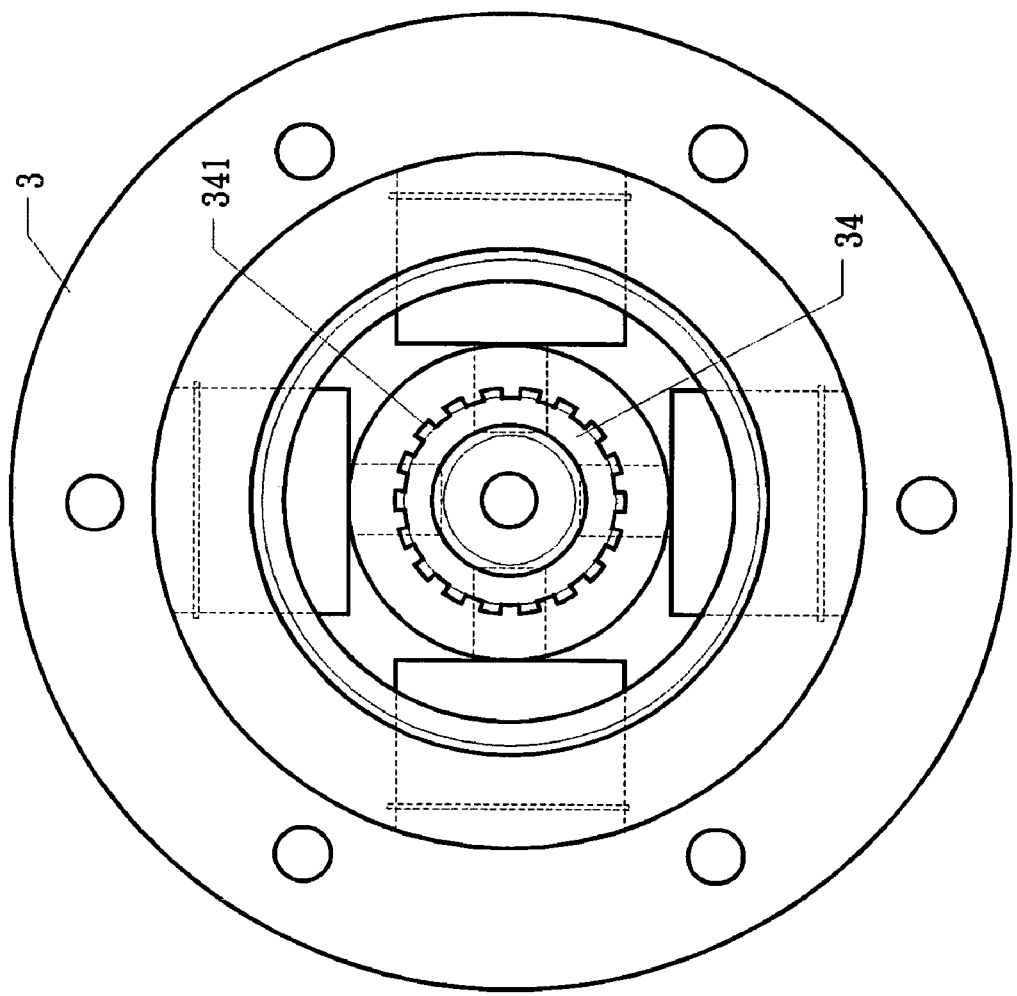
FIG. 5 is a right lateral view of the planetary gear carrier in FIG. 4.
Figure 4:
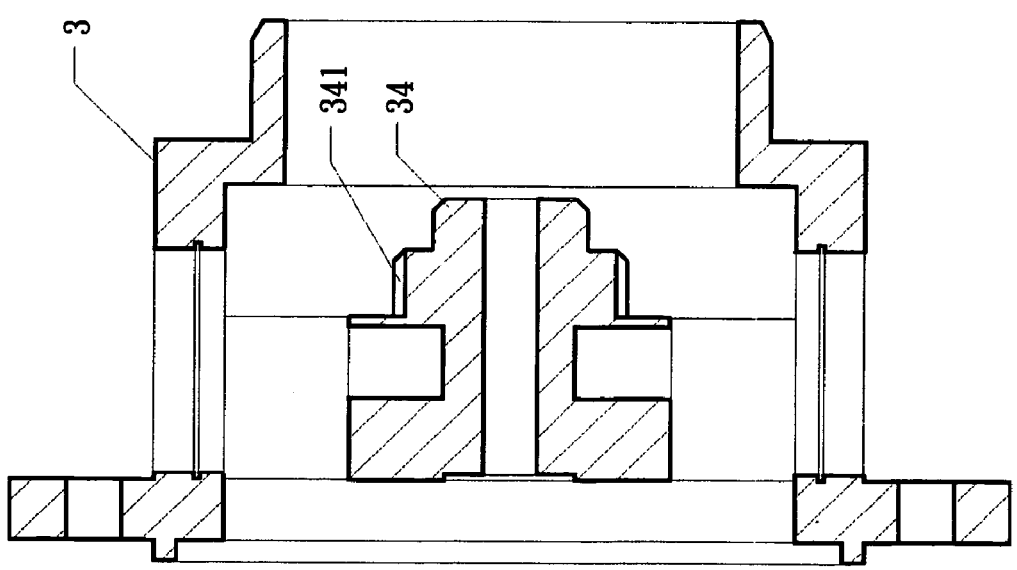
FIG. 4 is a cross-sectional view of the planetary gear carrier of the differential gear system with a three-step control mechanism in FIG. 1.
Figure 7:
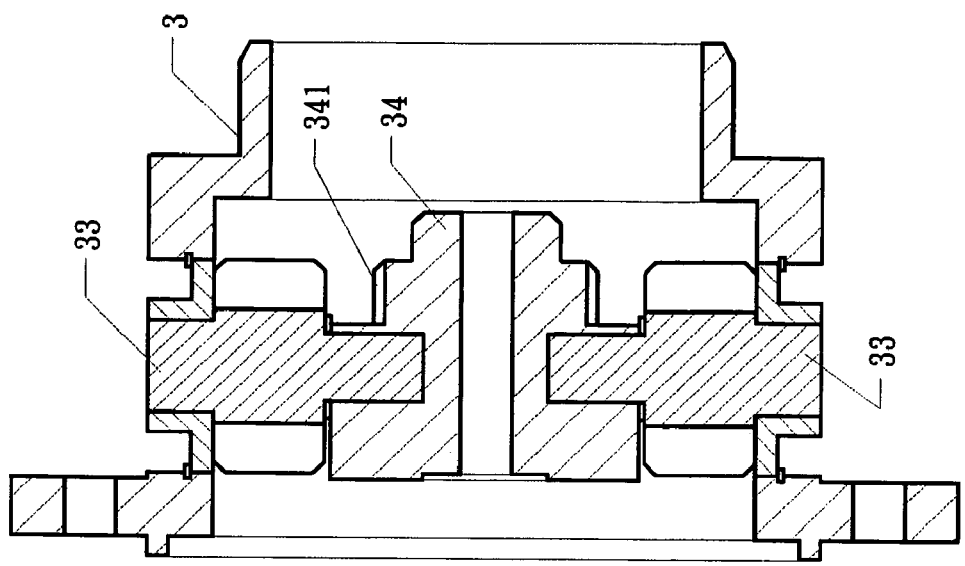
FIG. 7 is a cross-sectional view of the planetary gear carrier and the planetary gear therein.
Figure 6:
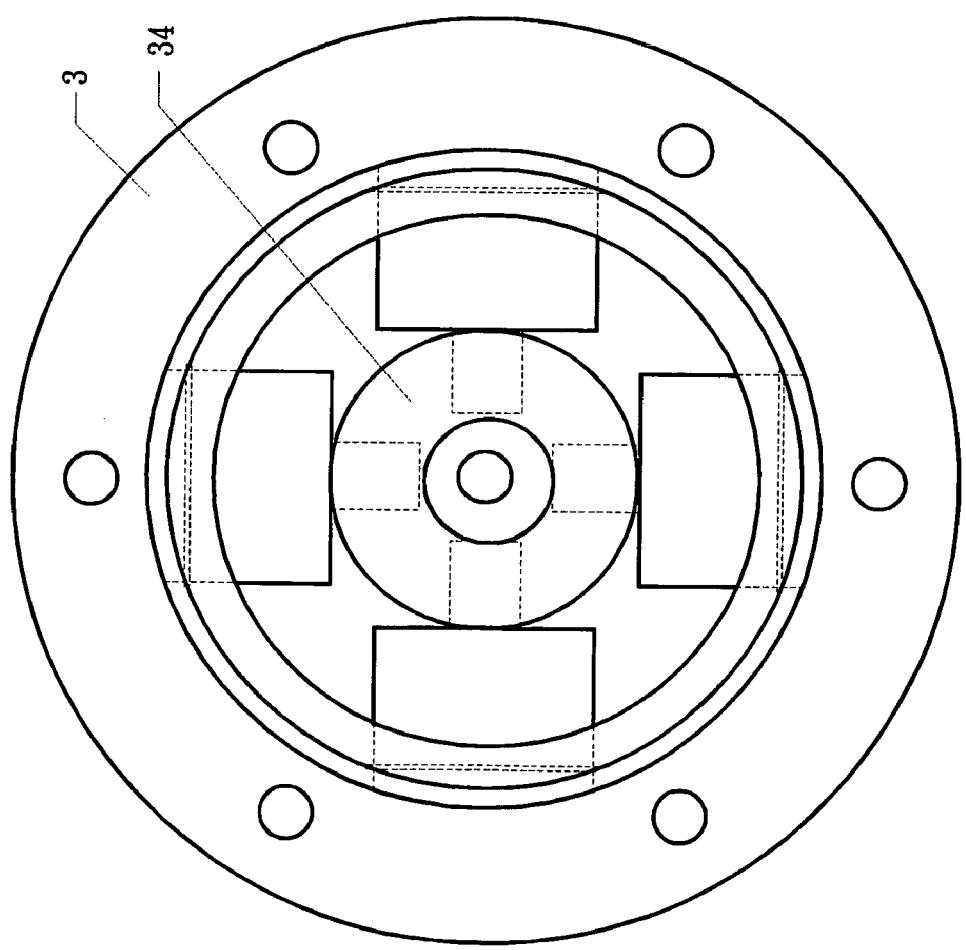
FIG. 6 is a left lateral view of the planetary gear carrier in FIG. 4.

As shown in FIGS. 1 to 3, the planetary gear carrier 3 comprises not only the left gear 31 (which can be a spiral bevel gear or a planar gear), the right gear 32 (which can be a spiral bevel gear or a planar gear) and the central retaining section 341 but also a planetary gear 33. The axial hole of the left gear 31 is provided with the retaining section 310, and the axial hole of the right gear 32 is provided with a second retaining section 320. The engagement mount 34 is provided with the retaining section 341 for the engagement of the clutch sleeve 4. The retaining section 341 can formed on the outer or inner rims of the engagement mount 34.

As shown in FIG. 1, the push rod 5 drives the clutch sleeve 4 to the first location where the clutch sleeve 4 is not engaged with the right gear 32 and the planetary gear carrier 3. Therefore, the differential gear system is in an OFF state.

As shown in FIG. 2, the push rod 5 drives the clutch sleeve 4 along the axis to the second location where the clutch sleeve 4 is engaged with the right gear 32 but not the planetary gear carrier 3. Therefore, the differential gear system is in an ON state.

As shown in FIG. 3, the push rod 5 drives the clutch sleeve 4 along the axis to the third location where the clutch sleeve 4 is engaged with the right gear 32 and the planetary gear carrier 3. Therefore, the differential gear system is in a LOCK state.

Figure 8:
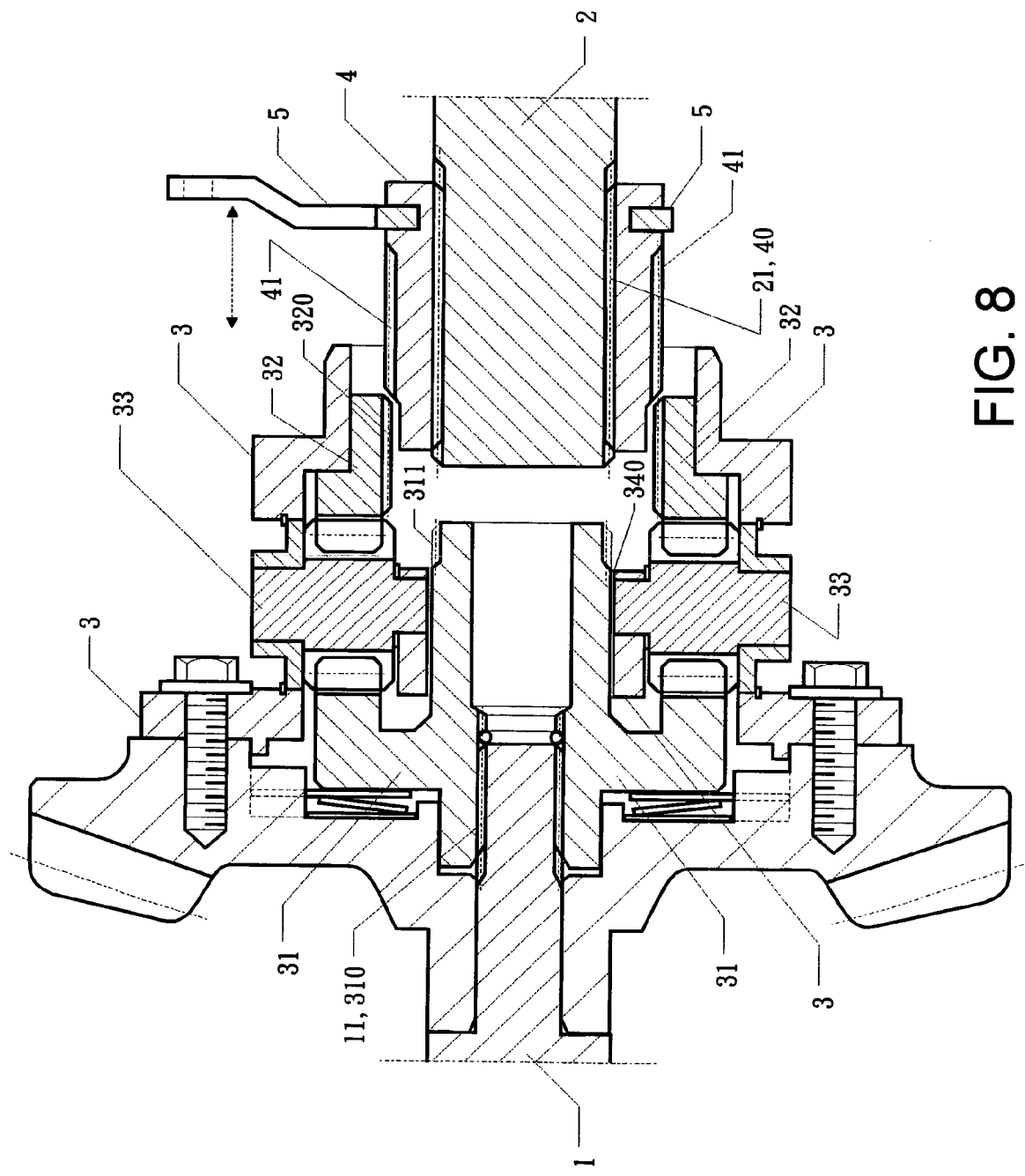
FIG. 8 is a side cross-sectional view of the second preferred embodiment of the present invention as a differential gear system with a three-step control mechanism.

Referring to FIG. 8, another preferred embodiment of the present invention as a differential gear system with a three-step control mechanism has a planetary gear carrier 3 without an engagement mount 34 but with an axial through hole 340. The outer surface or the inner surface of the left gear 31 is provided with a retaining section 311, which replaces the retaining section 341 on the engagement mount 34, whereby the clutch sleeve 4 can still be engaged with the left gear 31 via axial shifting and will attain an equivalent LOCK effect.

The planetary gear carrier 3 of the preferred embodiment shown in FIG. 8 has an axial through hole 340, whereby the clutch sleeve 4 can be directly engaged with the left shaft 1 as it is shifting inward, and whereby an equivalent LOCK effect can be attained.

Therefore, a differential gear system with a three-step control mechanism of the present invention indeed has a locking mechanism installed in the planetary gear carrier 3 between two planetary gears of the planetary gear carrier 3, whereby extra space for the locking mechanism is not necessary. Therefore, the differential gear system is of small size, and its production cost will be reduced.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A differential gear system with a three-step control mechanism, comprising:
   a left shaft;
   a right shaft; and
   a planetary gear carrier disposed between said left shaft and said right shaft having a locking mechanism located therein between a left gear and a right gear for economizing the installation space of said locking mechanism; whereby one single axial rotation will achieve functions of on, off and lock of said differential gear system.

2. The differential gear system with a three-step control mechanism of claim 1 wherein said left gear and said right gear are planar gears.

3. The differential gear system with a three-step control mechanism of claim 1 wherein said left gear and said right gear is spiral bevel gears.

4. The differential gear system with a three-step control mechanism of claim 1 wherein a control mechanism that switches between an on, an off, and an lock functions of said differential gear system is installed between either of said gears and a corresponding shaft.

5. The differential gear system with a three-step control mechanism of claim 1 wherein said locking mechanism is installed at an engagement mount at a central portion of said planetary gear carrier; said engagement mount being provided with a retaining section for engagement.

6. The differential gear system with a three-step control mechanism of claim 1 wherein said locking mechanism is installed at an engagement mount at a central portion of said planetary gear carrier; said engagement mount being provided with a retaining section for engagement; said retaining section of said engagement mount being formed on an outer rim thereon.

7. The differential gear system with a three-step control mechanism of claim 1 wherein said locking mechanism is installed at an engagement mount at a central portion of said planetary gear carrier; said engagement mount being provided with a retaining section for engagement; said retaining section of said engagement mount being formed on an inner rim thereon.

8. A differential gear system with a three-step control mechanism, comprising:
   a left shaft being an one-piece axle with an end connecting section;
   a right shaft being an one-piece axle with an end connecting section engaged with a retaining section of a clutch sleeve mounted on said right shaft; and
   a planetary gear carrier having a left gear, a right gear and an engagement mount mounted therein, said engagement mount further including a retaining section for the engagement of said clutch sleeve, said planetary gear carrier being located between said left shaft and said right shaft having a locking mechanism located therein between a left gear and a right gear for economizing the installation space of said locking mechanism, said connecting section of said left shaft being engaged with said left gear in said planetary gear carrier;

whereby one single axial rotation will achieve functions of on, off and lock of said differential gear system.

9. The differential gear system with a three-step control mechanism of claim 8 wherein said clutch sleeve of said three-step control mechanism has retaining sections on both an inner and an outer surfaces.

10. The differential gear system with a three-step control mechanism of claim 9 wherein said inner retaining section is locked on one end with said connecting section of said left shaft and on the other end is slidably connected with said retaining section of said planetary gear carrier; said outer retaining section being engaged with a retaining section in said right gear.

11. The differential gear system with a three-step control mechanism of claim 8 wherein said clutch sleeve is driven by a push rod to selected locations in an axial direction.

12. A differential gear system with a three-step control mechanism, comprising:
   a left shaft being an one-piece axle with an end connecting section;
   a right shaft being an one-piece axle with an end connecting section engaged with a retaining section of a clutch sleeve mounted on said right shaft; and
   a planetary gear carrier having a left gear, a right gear and an engagement mount mounted therein, said engagement mount further including a retaining section for the engagement of said clutch sleeve, said planetary gear carrier being located between said left shaft and said right shaft having a locking mechanism located therein between a left gear and a right gear for economizing the installation space of said locking mechanism, said connecting section of said left shaft being engaged with said left gear in said planetary gear carrier;
   whereby one single axial rotation will achieve functions of on, off and lock of said differential gear system.

13. The differential gear system with a three-step control mechanism of claim 12 wherein said clutch sleeve of said three-step control mechanism has retaining sections on both an inner and an outer surfaces.

14. The differential gear system with a three-step control mechanism of claim 13 wherein said inner retaining section is locked on one end with said connecting section of said left shaft and on the other end is slidably connected with said retaining section of said planetary gear carrier; said outer retaining section being engaged with a retaining section in said right gear.

15. The differential gear system with a three-step control mechanism of claim 12 wherein said clutch sleeve is driven by a push rod to selected locations in an axial direction.

\* \* \* \* \*